United States Patent [19]

Jen et al.

[11] 3,789,365

[45] Jan. 29, 1974

[54] PROCESSOR INTERRUPT SYSTEM

[75] Inventors: Dixson Teh-Chao Jen, Monroe; Amram Zvi Lotan, Stamford, both of Conn.

[73] Assignee: The Bunker-Ramo Corporation, Oak Brook, Ill.

[22] Filed: June 3, 1971

[21] Appl. No.: 149,474

[52] U.S. Cl. .......... 340/172.5
[51] Int. Cl. .......... G06f 9/18
[58] Field of Search .......... 340/172.5

[56] References Cited

UNITED STATES PATENTS

| | | | |
|---|---|---|---|
| 3,386,083 | 5/1968 | Geller et al. | 340/172.5 |
| 3,534,339 | 10/1970 | Rosenblatt | 340/172.5 |
| 3,643,229 | 2/1972 | Stuebe | 340/172.5 |
| 3,444,525 | 5/1969 | Barlow et al. | 340/172.5 |
| 3,341,817 | 9/1967 | Smeltzer | 340/172.5 |
| 3,359,544 | 12/1967 | Macon et al. | 340/172.5 |
| 3,373,408 | 3/1968 | Ling | 340/172.5 |
| 3,453,600 | 7/1969 | Stafford et al. | 340/172.5 |
| 3,440,612 | 4/1969 | Womack | 340/172.5 |
| 3,553,653 | 1/1971 | Krock | 340/172.5 |
| 3,602,901 | 8/1971 | Jen | 340/172.5 |

*Primary Examiner*—Paul J. Henon
*Assistant Examiner*—Paul R. Woods
*Attorney, Agent, or Firm*—Frederick M. Arbuckle; Ronald J. Kransdorf; Nathan Cass

[57] ABSTRACT

A method and apparatus for reducing the time required by a data processing system to perform interrupt save and restore operations. The number of required interrupts is reduced by delaying the input processing of service requests by a time which is less than the character time of the fastest device being served by the processor. At the end of the delay interval, an interrupt is generated, and all accumulated service requests processed at once. If the running program is completed during the delay interval, then all waiting service requests are processed at that time. The number of required interrupts is thus significantly reduced.

A memory device is provided for each processor element having values which must be saved when an interrupt occurs. When an interrupt occurs, the values in the elements are simultaneously written into the corresponding memory. When execution of the interrupted program is to resume, the stored values are simultaneously read back into the elements. Each memory may have a plurality of positions so as to permit the stacking of interrupts. The positions may correspond to program priority levels and the reading of information into, or the transfer of information from, a memory may be under control of a program priority indication.

16 Claims, 2 Drawing Figures

INVENTORS
Dixson Jen
Amram Lotan
BY Ronald Kransdorf
ATTORNEY

INVENTORS
Dixson Jen
Amram Lotan
BY
ATTORNEY

PROCESSOR INTERRUPT SYSTEM

This invention relates to data processing systems having various priority level interrupts and more particularly to method and apparatus for reducing the time required in such a system for performing interrupt save and restore operations.

BACKGROUND OF THE INVENTION

In a multi-program data processor, particularly one operating in a real-time environment, situations frequently arise when a program which is being executed by the machine must be interrupted in order to execute a program having higher priority, or at least to determine if a request for processor service has a higher priority than the program presently being serviced.

Thus, in applications where a number of terminal devices are being serviced by a processor, a request for service from one terminal may, because of the nature of the function performed by the terminal and/or the speed of the terminal, have priority over a request for service from another terminal. For example, a request for service by an on-line terminal would normally have priority over a request from an off-line terminal. However, regardless of terminal priority, a program interrupt is normally required for each service request in order to permit the processor to execute an input routine on the request before it is lost. Similarly, certain internal interrupts in the machine, such as override routines and certain error routines, would have higher priority, and the detection of a condition causing one of these programs to be executed would result in a machine interrupt being generated.

When an interrupt is generated, various values stored in processor registers, counters, and other elements for the program being executed must be saved in order that the interrupted program may take up where it left off when the interrupting program has been completed. This save operation is normally performed by reading the value stored in each element into a buffer area of the processor memory in some predetermined sequence and then reading these stored values out of the memory back into the elements in the same sequence when the interrupting program has been completed. However, since there are normally a dozen or more of these elements, it can be seen that this technique requires many memory cycles to perform each save and restore operation.

In applications where the number of priority levels are few, and interrupts occur only under extraordinary conditions, the time required for each save and each restore operation utilizing the above technique is not a serious problem. However, in real time applications where requests for service are frequent, necessitating numerous input interrupts, and where, because of variations in function and speed of the terminals feeding data to, and receiving data from, the processor, a number of priority levels are required, resulting in the stacking of interrupts, the time required for save and restore operations may significantly reduce the overall efficiency of the system.

One existing system reduces the time required for save and restore operations by providing several groups of like elements in the system and gates a new set of elements into the system, under control of a pointer register, when an interrupt occurs. The number of sets of elements would typically be equal to the number of priority levels available in the system. While this scheme is efficient from the standpoint of processor time, it requires the use of a substantial amount of redundant hardware and, in addition, requires a relatively complex gating and switching network in order to connect the proper set of registers, counters and other elements into the system. This scheme is thus relatively complex and expensive.

A need therefore exists for a program interrupt system which permits the save and restore operation to be performed rapidly, preferably within one memory cycle of the machine, while requiring a minimum of complex and expensive hardware to be added to the system.

However, even with rapid save and restore, a minimum of two memory cycles are required to perform these functions for each interrupt. It would therefore be preferable if the input processing of service requests could be delayed, permitting the execution of a program to be completed, thus eliminating the need for save and restore operations; or at least if several interrupts could be processed at once rather than interrupting the processor with each new service request. However, the delay in processing an interrupt must not be so great as to permit information to be lost. A need therefore exists for an apparatus and method of further reducing the time required for interrupt save and restore operations by delaying input processing of a request to eliminate the need for save and restore, or at least to permit several interrupts to be processed between each save and restore, while not delaying the processing of a service request long enough to cause the loss of input information.

It is thus a primary object of this invention to provide an improved program interrupt method and apparatus for a data processor. A more specific object of this invention is to minimize the processor time required to perform interrupt save and restore operations.

A still more specific object of this invention is to provide a rapid save and restore method and apparatus for a data processor having various priority level interrupts.

Another object of this invention is to provide a save and restore scheme of the type indicated above which is relatively simple and inexpensive to implement.

A further object of this invention is to provide a method and apparatus for reducing the number of save and restore operations required by permitting a running program to be completed before a service request is processed, or at least by permitting a number of interrupts to be processed between each save and restore.

SUMMARY OF THE INVENTION

In accordance with these objects this invention provides a processor in which various priority level interrupts may occur. The processor has a requirement that values stored in various elements, such as registers and counters, of the processor when a program is interrupted be saved, and that these values be restored in the elements when the execution of the interrupted program is resumed. The processor includes a means for reducing the processor time required for save and restore operations. This means includes a means for indicating the program being executed by the processor such as by indicating its priority level, and a memory device corresponding to each of the elements. A means is provided which is operative when an interrupt occurs in the processor to store the value in each element in the corresponding memory device at a position in the memory device controlled by the indicating means. When the execution of a program is completed, a means is provided for setting the indicating means to the priority level for the next program to be executed and a means is provided which is operative when the indicating means indicates a priority level of an interrupted program for transferring the value stored for the program in each memory device back into the corresponding element.

A timing means is also provided which, when set, inhibits the interrupting of the processor by an input service request. The setting of the timing means is controlled by a means responsive to a predetermined service request condition at the processor. For example, the timing means may be enabled when there are no interrupt inputs to be processed. The next service request is then operative to set the timing means, the duration of the inhibit being less than the character time of the fastest terminal being serviced by the processor. If the program being executed by the processor is completed while the timing means is set, the inhibit is disabled, permitting any waiting service requests to be processed.

The foregoing and other objects, features and advantages of the invention will be apparent from the following more particular description of a preferred embodiment of the invention as illustrated in the accompanying drawings.

DESCRIPTION OF PREFERRED EMBODIMENT

Figure 1:
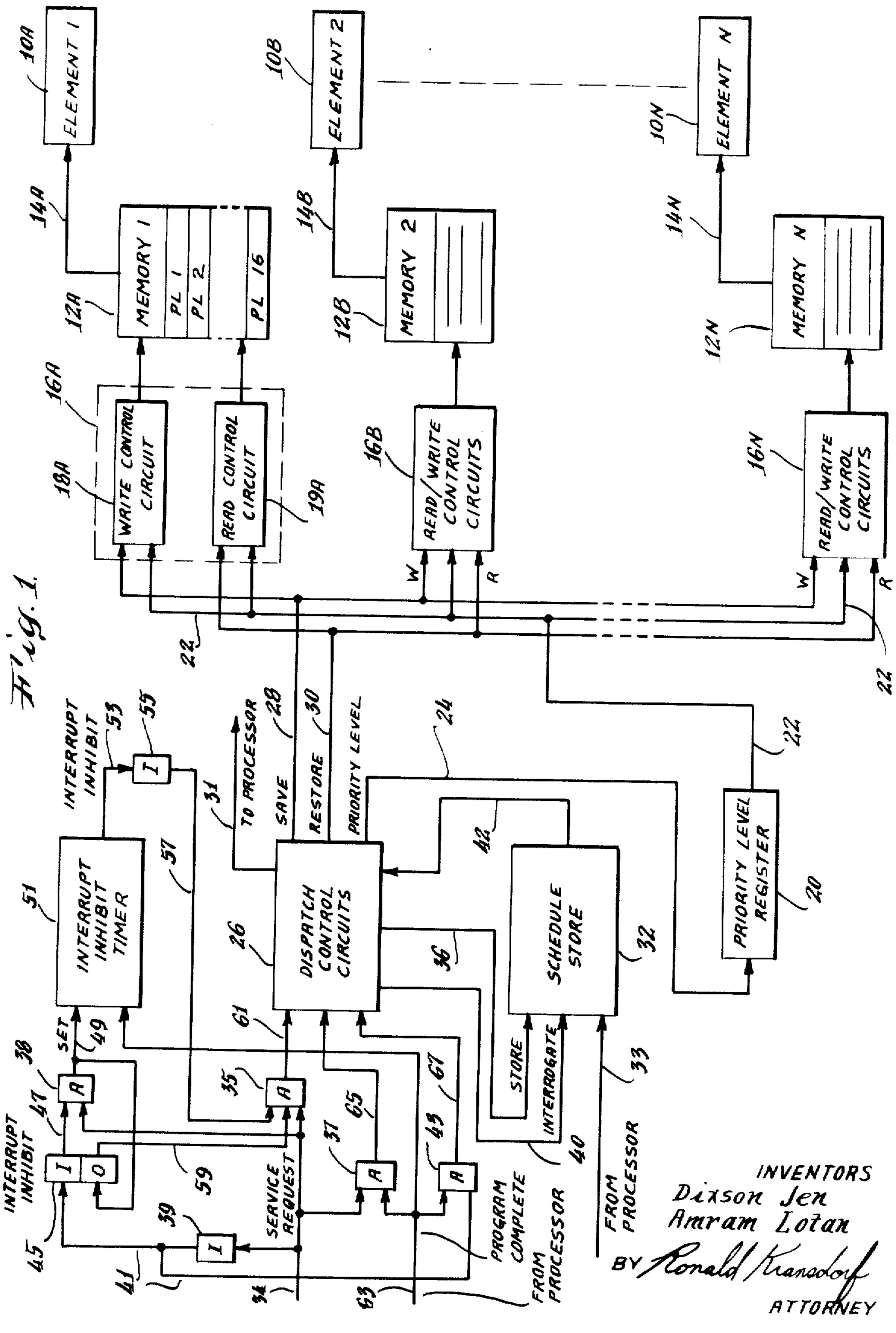
FIG. 1 is a block schematic diagram of a preferred embodiment of the invention.

Referring now to FIG. 1, it is seen that the processor has a plurality of elements 10 which contain values utilized by the processor during the running of a program. These values are to be saved during an interrupt operation. The elements 10 may for example be registers, counters, or similar devices, the processor program counter being an example of one such element. There would be about a dozen elements 10 in a normal system.

For each element 10, there is an associated memory 12 connected to the element through bi-directional line 14. Each memory 12 may be a relatively inexpensive solid-state storage device. The number of memory positions in each memory 12 would normally be equal to the number of program priority levels in the system. For purposes of illustration this number has been shown as sixteen in FIG. 1. However, in some applications, a greater or lesser number of memory positions might for some reason be provided in each of these memories. A read-write control circuit 16 is provided for each memory 12. Each control circuit 16 consists of a write control circuit 18 and a read control circuit 19 (circuits 18 and 19 being shown only for control circuit 16A but being present in the other control circuits 16 as well). The address input to each of the control circuits 16 is derived from a priority level register 20 over lines 22. At any time in the operating cycle of the processor, register 20 indicates the interrupt priority level of the program presently being executed. Register 20 is loaded over a line 24 from dispatch control circuit 26. Dispatch control circuit 26 also issues save commands over line 28 to write control circuits 18 of the control circuits 16 to cause the values stored in elements 10 to be stored at the address in the corresponding memory 12 corresponding to the priority level indicated in register 20. A restore signal on line 30 from dispatch control circuit 26 is applied to read control circuits 19 of control circuits 16 to cause the values stored at the address position in each memory 12 corresponding to the priority level indicated by register 20 to be read out over the corresponding line 14 to the corresponding element 10. Circuit 26 also outputs other control signals to the processor over line or lines 31.

A schedule store 32 is also provided. This element would normally be a selected area of the processor memory and is provided with any processor having an interrupt capa-bility. An example of a processor having a schedule store is the UNIVAC 1108. Schedule store 32 maintains a record of interrupted programs waiting to be completed and new programs in the processor waiting to be executed. The priority level for each program is stored with it as well as an indication of the address in processor memory where the program would begin (for interrupted programs this may not be necessary since the program counter is reloaded from its associated memory). The queue in the schedule store is such that, within the same prior level, interrupted programs have priority over new programs waiting to be executed.

When there is a request for processor service from a terminal or other external device, an input-output device (not shown) associated with the processor generates a signal on service request line 34. The signal on line 34 is applied as one input to AND gates 35, 37, and 38 and through inverter 39 and line 41 as one input to AND gate 43. The signal on line 41 is also applied to set Interrupt Inhibit flip flop 45 to its One state. One-side output line 47 from flip-flop 45 is connected as the other input to AND gate 38. Output line 49 from AND gate 38 is connected as the Zero-side input to flip-flop 45 and as the set intput to interrupt inhibit timer 51. Timer 51 normally runs for a period of time which is slightly less than the character time (i.e. time which a character is present) for the fastest terminal serviced by the processor. When timer 51 is set, a signal appears on interrupt inhibit line 53. The signal on line 53 is applied through inverter 55 and line 57 as a second input to AND gate 35. The final input to AND gate 35 is Zero-side output line 59 from Interrupt Inhibit flip flop 45. Ouput line 61 from AND gate 35 is the interrupt input to dispatch control circuit 26.

When the execution of a program in the processor is completed, the processor applies a signal through line 63 to the second input of AND gates 37 and 43 and to the reset input of interrupt inhibit timer 51. Output lines 65 and 67 from AND gates 37 and 43 respectively are connected as inputs to dispatch control circuit 26.

When dispatch control circuit 26 receives an interrupt on line 61, and there is no signal on line 65, circuit 26 passes a signal to save line 28. An input to circuit 26 on line 61 also causes information on the service requested to be stored in the processor and in schedule store 32. The command to store information received on line 33 from the processor in schedule store 32 is received over line 36. Under conditions to be described later, dispatch control circuit 26 generates an interrogate signal on line 40. The interrogate signal causes a search of store 32 to be performed for the highest priority program waiting to be executed and information on this program to be read out through line 42 to dispatch control circuit 26. The dispatch control circuit then generates the appropriate outputs on lines 24 and 30 in addition to generating other signals on line 31 required within the processor to cause a program execution to be initiated.

While a separate dispatch control circuit 26 has been shown in FIG. 1, it is to be understood that special purpose circuitry would normally not be provided for performing the functions ascribed to this circuit. Instead, these functions would normally be programmed to be performed by the general purpose hardware of the processor. Since interrupt handlers, dispatchers, and schedulers, or equivalent routines for performing the indicated functions, form part of the operating system of most general purpose computers, and the specific nature of these routines do not form part of the present invention, specific routines for performing thse functions will not be described herein. The UNIVAC 1108 for example has as part of its operating system programs called "interrupt handler," "dispatcher" and "scheduler," and these programs are adapted for performing the functions indicated as being performed by circuits 26.

While the save and restore signals on lines 28 and 30 respectively are normally generated by the operating system of the computer, hardware for generating these signals could be easily provided. Thus, a signal on line 61 could be connected directly to line 28 as a save signal. In the alternative, line 28 may be the output from an AND gate, the inputs to which are line 61 and the output from an inverter, the input to which is line 65. The AND gate insures that a save signal is not generated when a running program has been completed and there is no need to save the contents of the various elements 10. Restore line 30 may be the output from a delay circuit, the input to which is line 67. The delay should be sufficient to permit the processor to make a priority determination and load the new priority level into register 20.

OPERATION

Figure 2:
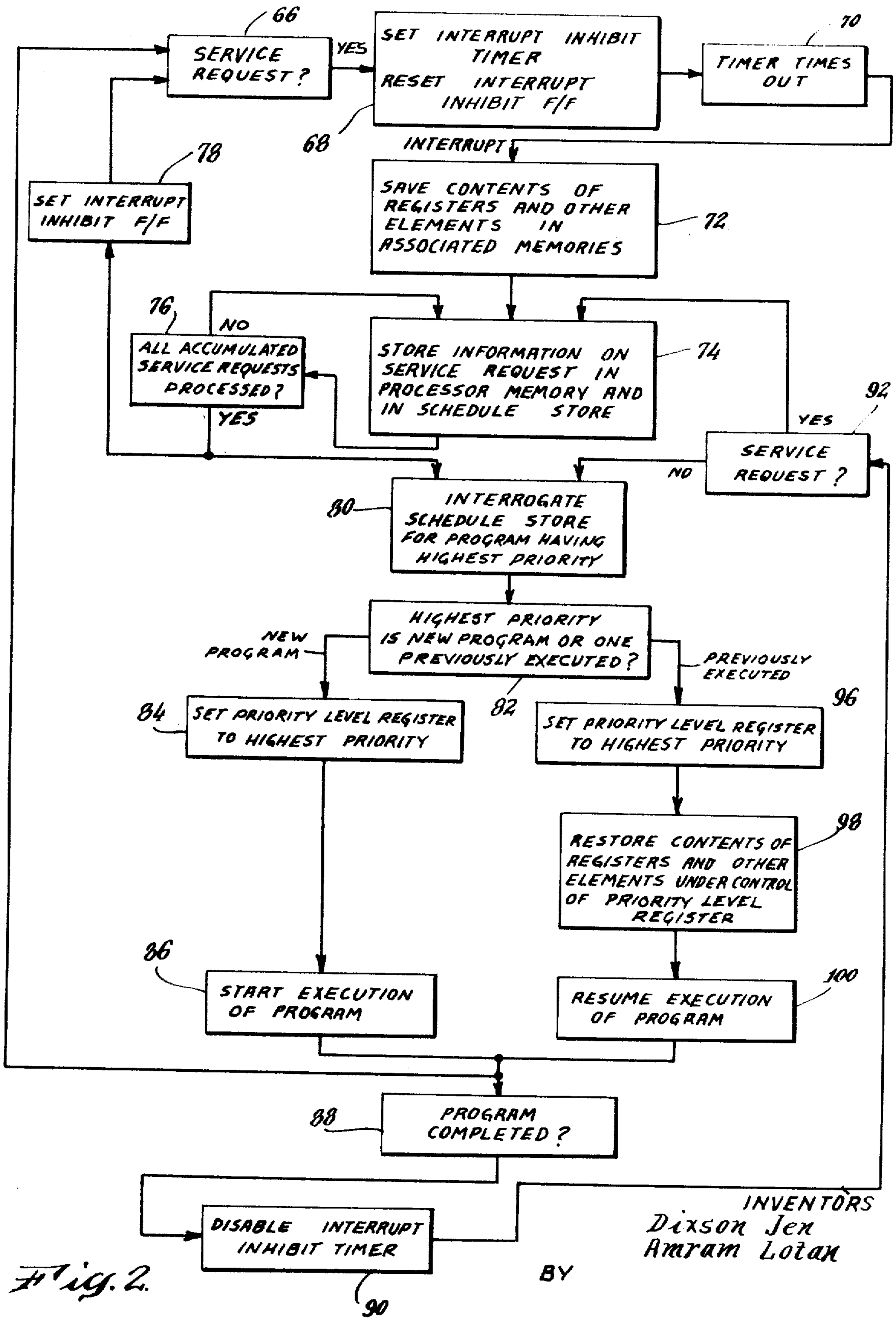
FIG. 2 is a flow diagram for the method and apparatus of this invention.

FIG. 2 is a flow diagram illustrating the manner in which the system operates. Assume initially that a program of, for example, priority 7, is being executed in a processor adapted to receive sixteen different priorities of interrupts, that, while the program is being executed, a request for service having a priority 5 is received over line 34 and that this is the first service request received since service requests were last processed. (Step 66). As will be seen from the discussion to follow, interrupt inhibit flip flop 45 is set to its One state when there are no service requests on line 34. Flip flop 45 will thus be in its One state at this time, generating a conditioning input on line 47 to AND gate 38. Flip flop 45 being in its One state, AND gate 35 is deconditioned preventing the service request on line 34 from being applied as an interrupt input to dispatch control circuit 26. The service request on line 34 is, however, effective to fully condition AND gate 38 resulting in a signal on line 49 which resets flip flop 45 to its Zero state and sets interrupt inhibit timer 51 (step 68). While timer 51 is running, an interrupt inhibit signal appears on line 53 preventing inverter 55 from generating a conditioning input to AND gate 35. Thus, the processing of the service request on line 34 is delayed. During the running of timer 51, additional service requests may be received. However, since the duration of timer 51 is less than the character time of any terminal being serviced by the processor, no information is lost.

Assume initially that timer 51 times out before the running program is completed. Under these conditions, a save operation must be performed. When timer 51 times out, step 70, AND gate 35 is fully conditioned to generate an interrupt input on line 61 to dispatch control circuit 26. The interrupt signal on line 61 is passed directly to line 28 to initiate the save operation (step 72). The signal on line 28 is applied as a write input in each of the write control circuits 18 in the read-write control circuits 16. This energizes the write control circuits to cause each memory 12 to store the contents of its associated element 10 at the address in the memory 12 indicated by priority level register 20. Since it is assumed that a priority 7 program was initially being executed, the information being saved would be stored in the PL 7 address position of each memory 12. The save operation described above is performed in parallel in the memories 12, and is thus effected in the time required for one memory cycle. This is less than 10% of the time normally required to perform the save operation in existing systems and requires about the same time as the more expensive and complex system described earlier.

At the same time the save operation of step 72 is being performed, the storing of information on the service request, including its priority level and the address where execution of the program called for by the request is to commence is stored in scheduled store 32. This is performed in conjunction with the normal input processing of the service request which involves, among other things, the storing of additional information relating thereto in the processor memory (step 74). As indicated previously, the storing of information in schedule store 32 is under control of signals on line 36, the inputs to the schedule store being on line 33, and initiation of the input processing by the processor is under control of a signal or signals on line 31.

When the input processing of a first service request from the input/output interface of the processor has been completed, dispatch control circuit 26 tests to determine whether service request line 34 is still high (step 76). Since flip-flop 45 is in its Zero state, and timer 51 has timed out, AND gate 35 will remain fully conditioned to apply an interrupt input through line 61 to dispatch control circuit 26 so long as line 34 remains high. From FIG. 2, it is seen that, so long as there are service requests to be processed, dispatch control circuit 26 causes the processor input routine to be re-executed, including the storing of information in schedule store 32.

When all of the service requests which were accumulated at the processor input/output interface during the running of timer 51 have been processed, a signal no longer appears on service request line 34 deconditioning AND gate 35. The absence of a signal on line 34 causes inverter 39 to generate an output on line 41 which is applied to set Inhibit Interrupt flip-flop 45 to its One state (step 78). This effectively inhibits any new service request from generating an interrupt to circuit 26.

When, during step 76, dispatch control circuit 26 determines that there are no further service requests to be processed (i.e., there is no signal on input line 61) circuit 26 generates an output on interrogate line 40 to schedule store 32 (step 80). The object of the interrogate step is to determine the highest priority program waiting to be executed (step 82). Assume that the priority 5 program called for by the first service request is the highest priority program called for during the interrupt step just completed. Since it can be further assumed that the program which was being executed at the time of the interrupt was the highest priority program in the system at that time, the new program would now be the highest priority program in the system resulting in a branch to step 84. Under these conditions, dispatch control circuit 26 would set the priority level of the new program (priority 5) into priority level register 20 (step 84) and appropriate signals would be sent over line 31 to cause the processor to start execution of this new program (step 86).

Assume now that while the priority 5 program is being executed, one or more service requests are received at the processor input/output interface causing a signal to appear on line 34, and that at least one of the received service requests calls for a priority 3 program to be executed. On the receipt of the first service request, AND gate 38 is fully conditioned causing interrupt inhibit timer 51 to be set. However, assume that the execution of the priority 5 program is completed while the timer is still running (step 88) causing a signal to appear on line 63. The signal on line 63 is applied to reset timer 51 reconditioning AND gate 35 to cause an interrupt signal to be applied to circuit 26 (step 90). However, since a signal also appears on line 34 at this time, AND gate 37 is fully conditioned to generate an output on line 65 which is also applied to dispatch control circuit 26. This effects the performance of step 92. The signal on line 65 inhibits the interrupt signal from being applied to save line 28, this operation not being required since the execution of the running program was completed. Dispatch control circuit 26 thus branches to step 74 to cause the input processing of the received service requests to be performed in the manner previously indicated. When all service requests have been processed, interrupt inhibit flip-flop 45 is set to its One state also in the manner previously indicated.

When schedule store 32 is now interrogated during step 80, it is found that the priority 3 program called for by one of the received service requests now has the highest priority (step 82), and priority level register 20 is set to indicate a priority level of 3 during step 84. Execution of the new program is then initiated during step 86.

If the service request or requests processed during the next interrupt require no program having a priority greater than 3, the priority of the program presently being executed, then, steps 66, 68, 70, 72, 76, and 78 would be performed in substantially the manner previously indicated, the only exception being that, during step 72, the contents of elements 10 would be stored in the PL3 position of each memory 12. However, during the interrogation step 80, dispatch control circuit 26 would receive an indication that the program previously being executed was the highest priority program in the system causing the processor to branch to step 96. During step 96, the priority level for this program, in this instance priority 3, would be set into priority level register 20, and a restore signal would then be applied by dispatch control circuit 26 to line 30. This causes the values stored in the PL3 positions of memories 12 to be read out under control of circuits 16 into the corresponding elements 10 (step 98). The execution of the interrupted program is then resumed (step 100).

Assume now that the interrupted program was nearly complete so that its execution is completed prior to the receipt of a new service request (step 88). The resulting signal on line 63 is applied to reset timer 51. However, since the timer is not now set, this signal is ineffectual. Since there is no signal on service request line 34, a signal appears on line 41 fully conditioning AND gate 43 to generate a signal on line 67. A signal on line 67 is interpreted by dispatch control circuit 26 as indicating that a program has been completed but that there is no service request present (step 92), causing the processor to branch to step 80. Schedule store 32 is thus interrogated to determine the highest priority program waiting to be executed. If during the execution of the priority 3 program, a service request requiring another priority 3 program was received, this would now be the highest priority program waiting to be executed and the system would branch to step 84 setting priority level 3 into register 20 and initiate the execution of the new program in a standard fashion. A similar sequence of operations would be performed if a priority 4 - 6 program was awaiting execution. However, if no service request requiring a program having a priority higher than the priority 7 program which was previously interrupted was received in the interim, then the system would branch to step 96, setting priority 7 into register 20 and generating a restored signal on line 30 to cause the values in the PL7 position of each memory 12 to be read back into the corresponding element 10. Since interrupt inhibit flip-flop 45 remains in its One state, the next service request on line 34 would cause the setting of interrupt inhibit timer 51. The circuit would thus be conditioned to generate another interrupt should the priority 7 program being executed not be completed prior to the timing out of the timer.

From the above it is apparent that a simple and efficient system has been provided for significantly reducing the number of save and restore operations required in a processor and for performing the required save and restore operations as rapidly as possible. The system provides great flexibility in that the values from many levels of interrupted programs may be simultaneously retained while still permitting rapid restoration of required values when the execution of any interrupted program is initiated. The above is accomplished using a minimum of relatively low-cost components and without the need for complicated gating and switching circuits.

While for the preferred embodiment of the invention, values have been set into priority register 20, it is apparent that this register could in fact be a counter which is incremented or decremented in response to pulses received from circuit 26. Similarly, while separate positions in each memory 12 has been provided above for each priority level of program in the processor, with suitable program modifications, the number of positions in each of these memories could be reduced. It should also be noted that the duration of timer 51 might be controlled by other factors in addition to the device character time, such as, for example, device priority; and that the service request conditions controlling the timer may be varied. The timer itself might be a clocked shift register or counter, a single-shot, or other suitable means, and the duration of the timer might be made variable under manual or processor control. Thus, the terms "enable", "set", and "reset" as used above and in the claims, define the effective function being performed even though, for a particular timer means, actual setting, resetting, etc. might not be performed. The circuitry shown for delaying and accumulating service requests is thus for illustration only and these functions could be performed either by equivalent hardware or by suitable programming of the processor itself. Other similar modifications might be made while still practicing the teachings of the invention. Thus, while the invention has been particularly shown and described with reference to a preferred embodiment thereof, it will be understood by those skilled in the art that the foregoing and other changes in form and details may be made therein without departing from the spirit and scope of the invention.

What is claimed is:

1. In a processor of the type in which program interrupts occur when a request for processor service is received from a request generating means, there being a requirement to save the values stored in various elements of the processor when a program is interrupted and to restore the saved values in the elements when execution of the interrupted program is resumed, a system for reducing the processor time required for save and restore operations comprising:

timer means having a duration less than the character time of the fastest service request generating means, said timer generating a predetermined output when it times out;

means operative for setting said timer means in response to a predetermined service request condition at said processor;

memory means having at least one memory position for each of said elements;

means operative in response to the time-out output from said timer for storing the value in each element for the interrupted program in a memory position;

means for indicating when said interrupted program is the next program to be executed; and means responsive to said indicating means for transferring the values stored for said program in said memory positions back into the elements from which the values were read.

2. A system of the type described in claim 1 wherein said means for setting said timer means includes means responsive to the absence of service requests to said processor for enabling said timer means, and means jointly responsive to the receipt of a service request and to said timer means being enabled for setting said timer means.

3. A system of the type described in claim 1 including means for indicating that the execution of a program by said processor has been completed; and means responsive to said program completed indicating means for resetting said timer means if it is set.

4. A system of the type described in claim 1 including means operative when said timer means times out for initiating the input processing of service requests.

5. A system of the type described in claim 4 including means responsive to the initiating of the input processing of service requests and opera-tive so long as there are service requests to be processed for continuing the input processing of service requests.

6. A system of the type described in claim 1 wherein said processor has various priority levels for programs;

wherein said system includes means for indicating the priority level for the program to be executed;

wherein said memory means includes a memory device for each of said elements, each of said memory devices having a plurality of memory positions; and wherein the storing of values in said memory devices is under control of said priority level indicating means, each value being stored in a memory position corresponding to the indicated priority level for the interrupted program.

7. A system of the type described in claim 6 including means operative when a decision is made in said processor as to the next priority level to be executed for setting said program indicating means to the priority level of said next program; and wherein said value transferring means transfers the values stored in the memory devices at the positions corresponding to the indicated priority level back into the elements.

8. A processor in which various priority-level interrupts may occur, there being a requirement to save the values stored in various elements of the processor when a program is interrupted and to restore the saved values in the elements when the execution of the interrupted program is resumed, comprising:

means for indicating the priority level for the program being executed by said processor;

a memory device corresponding to each of said elements, each of said memory devices having at least one memory position for each priority level;

means operative when an interrupt occurs in said processor for storing the value in each element in the corresponding memory device at a position in the memory device determined by said indicating means;

means operative when the execution of a program is completed for setting said indicating means to the priority level for the next program to be executed; and means operative when said indicating means indicates the priority level of an interrupted program for transferring the value stored for the interrupted program in each memory device back into the corresponding element.

9. In a processor of the type in which program interrupts occur when a request for processor service is received from a request generating means, it being a requirement to save the values stored in various elements of the processor when the program is interrupted and to restore the saved values in the elements when execution of the interrupted program is resumed, a method for reducing the processor time required for save and restore operations comprising the steps of:

setting a timer means having a duration less than the character time of the fastest service request generating means in response to a predetermined service request condition at said processor;

storing the value in each element for the interrupted program in a predetermined position of a memory device in response to the timing out of said timer means;

indicating the program to be executed; and transferring the values stored for said interrupted program during said storing step in each said memory device position back into the corresponding element in response to an indication during said indicating step that the interrupted program is the next program to be executed.

10. A method of the type described in claim 9 wherein the step of setting the timer means includes the step of enabling said timer means in response to the absence of service requests to said processor, the timer means being set in response to the receipt of the first service request after the timer means is enabled.

11. A method of the type described in claim 9 including the steps of indicating when the execution of a program by said processor has been completed;

and resetting said timer means if it is set in response to said program complete indication.

12. A method of the type described in claim 9 including the step of initiating the input processing of service requests in response to the timing out of said timer means.

13. A method of the type described in claim 12 including the steps of determining if there are additional service requests to be processed; and continuing the input processing of service requests so long as there are service requests to be processed.

14. In a processor having various priority level interrupts, a method for saving the values stored in various elements of the processor when a program is interrupted and for restoring the saved values in the elements when the execution of the interrupted program is resumed, comprising the steps of:

storing an indication of the priority level of the program being executed or to be executed by the processor;

storing the contents of each of said elements in a position of a memory device associated with the element when an interrupt is received, the position being determined by the priority indicated for the interrupted program;

determining the program in the system which has the highest priority;

repeating the priority level storing step for the determined priority level;

reading the contents of each memory device for the indicated priority level out into the corresponding element if it is determined that the highest priority program is an interrupted program; and resuming program execution.

15. A method of the type described in claim 14 including the repeating of the determining, priority level storing, conditional reading and program execution resuming steps each time the execution of a program is completed.

16. A method of the type described in claim 14 wherein there is a memory position in said memory device for each priority level; and wherein the position in which a value is stored in one of said devices during said value storing step, and the position from which a value is read during said value reading step is the position for the priority level stored during said priority level storing step.

* * * * *